United States Patent
Tomonaga

(10) Patent No.: US 8,159,611 B2
(45) Date of Patent: Apr. 17, 2012

(54) TELEVISION RECEIVER FOR ELECTROMAGNETIC WAVE TYPE REMOTE CONTROL

(75) Inventor: Shusuke Tomonaga, Tokyo (JP)

(73) Assignee: Sony Corporation (JP)

( * ) Notice: Subject to any disclaimer, the term of this patent is extended or adjusted under 35 U.S.C. 154(b) by 909 days.

(21) Appl. No.: 12/229,259

(22) Filed: Aug. 21, 2008

(65) Prior Publication Data

US 2009/0147149 A1 Jun. 11, 2009

(30) Foreign Application Priority Data

Aug. 31, 2007 (JP) ................. P2007-225185

(51) Int. Cl.
*H04N 5/44* (2011.01)
(52) U.S. Cl. ........... 348/553; 348/87; 348/725; 348/734
(58) Field of Classification Search ................. None
See application file for complete search history.

(56) References Cited

U.S. PATENT DOCUMENTS

| | | | | |
|---|---|---|---|---|
| 4,947,235 A | * | 8/1990 | Roth et al. | ............ 257/659 |
| 6,822,697 B1 | * | 11/2004 | Osada | ................. 348/731 |
| 7,187,419 B2 | * | 3/2007 | Kawamura | .............. 348/725 |
| 2010/0091197 A1 | * | 4/2010 | Keen | ................. 348/725 |
| 2011/0136447 A1 | * | 6/2011 | Pascolini et al. | ........... 455/90.2 |

FOREIGN PATENT DOCUMENTS

| | | |
|---|---|---|
| JP | 5-1294 U | 1/1993 |
| JP | 5-48415 U | 6/1993 |

* cited by examiner

*Primary Examiner* — Brian Pendleton
*Assistant Examiner* — Dika C. Okeke
(74) *Attorney, Agent, or Firm* — Lerner, David, Littenberg, Krumholz & Mentlik, LLP

(57) ABSTRACT

The resent invention provides a television receiver including: a radio frequency section for an electromagnetic wave type remote control, the radio frequency section configured to transmit and receive an electromagnetic wave to and from the electromagnetic wave type remote control; and a retaining section configured to retain said radio frequency section for the electromagnetic wave type remote control; wherein said radio frequency section for the electromagnetic wave type remote control includes a radio frequency circuit board section, an antenna part, and a ground connecting section, said retaining section includes a conductive column support standing on a bezel, a column support standing on said bezel, and a conductive sheet metal parallel with said bezel and fixed to said conductive column support.

7 Claims, 5 Drawing Sheets

ARRANGEMENT SUCH THAT
ANTENNA DOES NOT OVERLAP     120
SHEET METAL PART

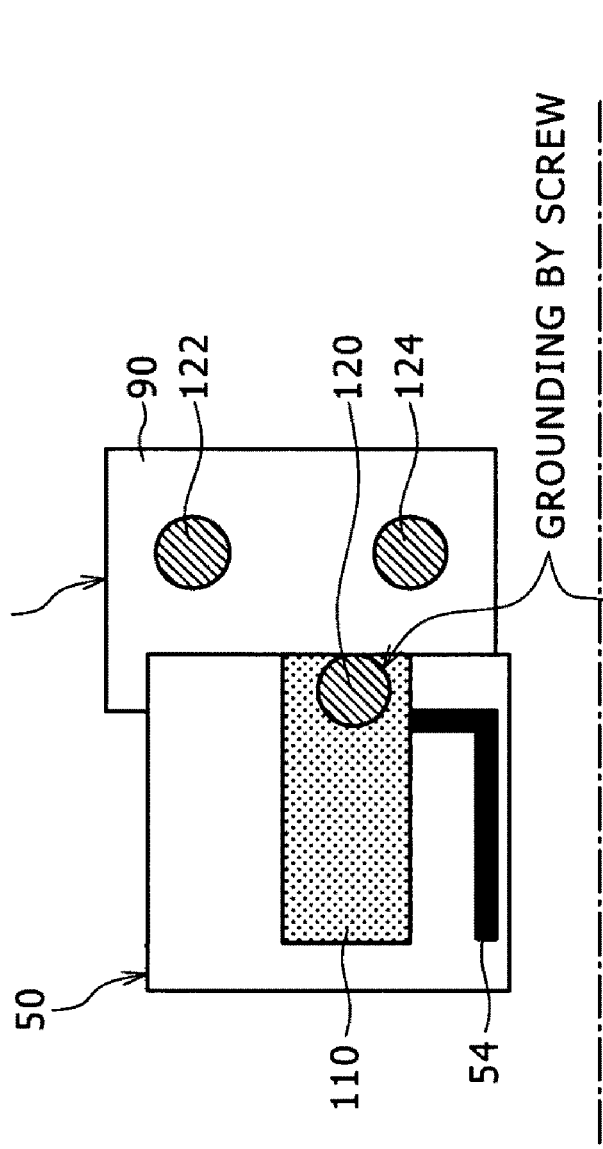
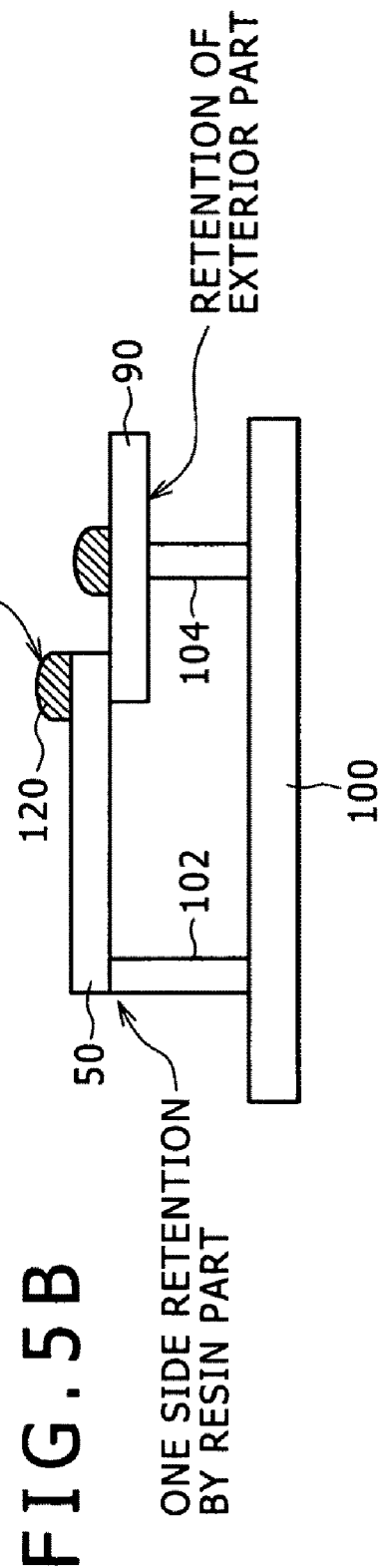
FIG. 5A
FIG. 5B

TELEVISION RECEIVER FOR ELECTROMAGNETIC WAVE TYPE REMOTE CONTROL

CROSS-REFERENCE TO RELATED APPLICATION

The present application claims priority from Japanese Patent Application No. JP 2007-225185, filed in the Japan Patent Office on Aug. 31, 2007, the entire content of which is incorporated herein by reference.

BACKGROUND OF THE INVENTION

1. Field of the Invention

The present invention relates to a television (TV) receiver, and particularly to a TV receiver using a remote control utilizing electromagnetic waves (hereinafter referred to as an electromagnetic wave type remote control) and a radio frequency (RF) device for the electromagnetic wave type remote control which device is used in the TV receiver.

2. Description of the Related Art

An infrared type remote control utilizing infrared rays has heretofore been used as a remote control (remote controller) of a TV receiver.

Infrared rays emitted from the infrared type remote control do not interfere with electric signals, and thus do not affect the operation of an electronic (electric) circuit within the TV receiver, while the infrared rays emitted from the infrared type remote control are not affected by the operation of the electronic (electric) circuit within the TV receiver.

An electromagnetic wave type remote control utilizing electromagnetic waves has recently come into use.

SUMMARY OF THE INVENTION

Electromagnetic waves emitted from the electromagnetic wave type remote control may affect the operation of an electronic (electric) circuit within the TV receiver. On the other hand, the electromagnetic waves emitted from the electromagnetic wave type remote control may be affected by the operation of the electronic (electric) circuit within the TV receiver.

Of course, because of low intensity of the electromagnetic waves used by the electromagnetic wave type remote control, there is a small possibility of the electromagnetic waves affecting the operation of the electronic (electric) circuit within the TV receiver. However, because the circuit of the TV receiver is packaged at a high density, and operating voltage of the circuit is lowered, the circuit of the TV receiver may be affected by the electromagnetic waves from the electromagnetic wave type remote control. On the other hand, when the electromagnetic waves emitted from the electromagnetic wave type remote control have low intensity, there is a strong possibility of the electromagnetic waves emitted from the electromagnetic wave type remote control being affected by the operation of the electronic (electric) circuit within the TV receiver.

Thus, there is a desire for a TV receiver that uses an electromagnetic wave type remote control and is able to eliminate the above-described effects. At the same time, there is a desire to establish a grounding circuit effectively.

The above-described desires are not limited to the TV receiver, but hold true for electronic devices and other devices such as air conditioners, for example.

According to an embodiment of the present invention, there is provided a TV receiver including: an RF (radio frequency) section for an electromagnetic wave type remote control, the RF section for the electromagnetic wave type remote control transmitting and receiving an electromagnetic wave to and from the electromagnetic wave type remote control; and a retaining section for retaining the RF section for the electromagnetic wave type remote control; wherein the RF section for the electromagnetic wave type remote control includes an RF circuit board section, an antenna part disposed so as to be separated from the RF circuit board section, and a ground connecting section disposed between the RF circuit board section and the antenna part and connected to a grounding system within the RF circuit board section, the retaining section includes a conductive column support standing on a bezel, a column support standing on the bezel, and a conductive sheet metal parallel with the bezel and fixed to the conductive column support, the ground connecting section of the RF section for the electromagnetic wave type remote control is fixed to the conductive sheet metal using a conductive fixture, and a grounding circuit of the RF circuit board section is established via the bezel, and the antenna part of the RF section for the electromagnetic wave type remote control is retained on one side by the column support at a position separated from the conductive sheet metal.

Preferably, when the ground connecting section is fixed via a screw, an electromagnetic shield is inserted between the antenna part and the screw.

In addition, preferably, when the antenna part of the RF section for the electromagnetic wave type remote control is retained on one side by the column support at a position separated from the conductive sheet metal, the antenna part of the RF section for the electromagnetic wave type remote control is retained by a resin part.

More preferably, the retaining section and the RF section for the electromagnetic wave type remote control are disposed at a position separated from a signal processing circuit within the TV receiver.

In addition, according to another embodiment of the present invention, there is provided an RF device for an electromagnetic wave type remote control for a TV receiver, the RF device for the electromagnetic wave type remote control transmitting and receiving an electromagnetic wave to and from the electromagnetic wave type remote control retained by a retaining section within the TV receiver, the RF device for the electromagnetic wave type remote control including: an RF circuit board section; an antenna part disposed so as to be separated from the RF circuit board section; and a ground connecting section disposed between the RF circuit board section and the antenna part and connected to a grounding system within the RF circuit board section.

Further, according to further embodiment of the present invention, there is provided an electronic device including: an RF section for an electromagnetic wave type remote control, the RF section for the electromagnetic wave type remote control transmitting and receiving an electromagnetic wave to and from the electromagnetic wave type remote control; and a retaining section for retaining the RF section for the electromagnetic wave type remote control; wherein the RF section for the electromagnetic wave type remote control includes an RF circuit board section, an antenna part disposed so as to be separated from the RF circuit board section, and a ground connecting section disposed between the RF circuit board section and the antenna part and connected to a grounding system within the RF circuit board section, the retaining section includes a conductive column support standing on a bezel, a column support standing on the bezel, and a conductive sheet metal parallel with the bezel and fixed to the conductive column support, the ground connecting section of the RF section for the electromagnetic wave type remote control is fixed to the conductive sheet metal using a conductive fixture, and a grounding circuit of the RF circuit board section is established via the bezel, and the antenna part of the RF section for the electromagnetic wave type remote control is retained on one side by the column support at a position separated from the conductive sheet metal.

According to the present invention, the antenna part of the RF section for the electromagnetic wave type remote control is isolated remotely from the conductive member, and a ground for the RF circuit board section of the RF section for the electromagnetic wave type remote control can be established without any additional part being used.

BRIEF DESCRIPTION OF THE DRAWINGS

FIGS. 5A and 5B are diagrams of assistance in explaining an example of mounting the RF board illustrated in FIG. 3 and illustrated in FIG. 4.

DETAILED DESCRIPTION OF THE PREFERRED EMBODIMENTS

Preferred embodiments of a TV receiver and an electronic device according to the present invention will hereinafter be described with reference to the accompanying drawings.

First Embodiment

A TV receiver according to a first embodiment of the present invention will be described with reference to FIGS. 1 to 5A and 5B.

Figure 1:
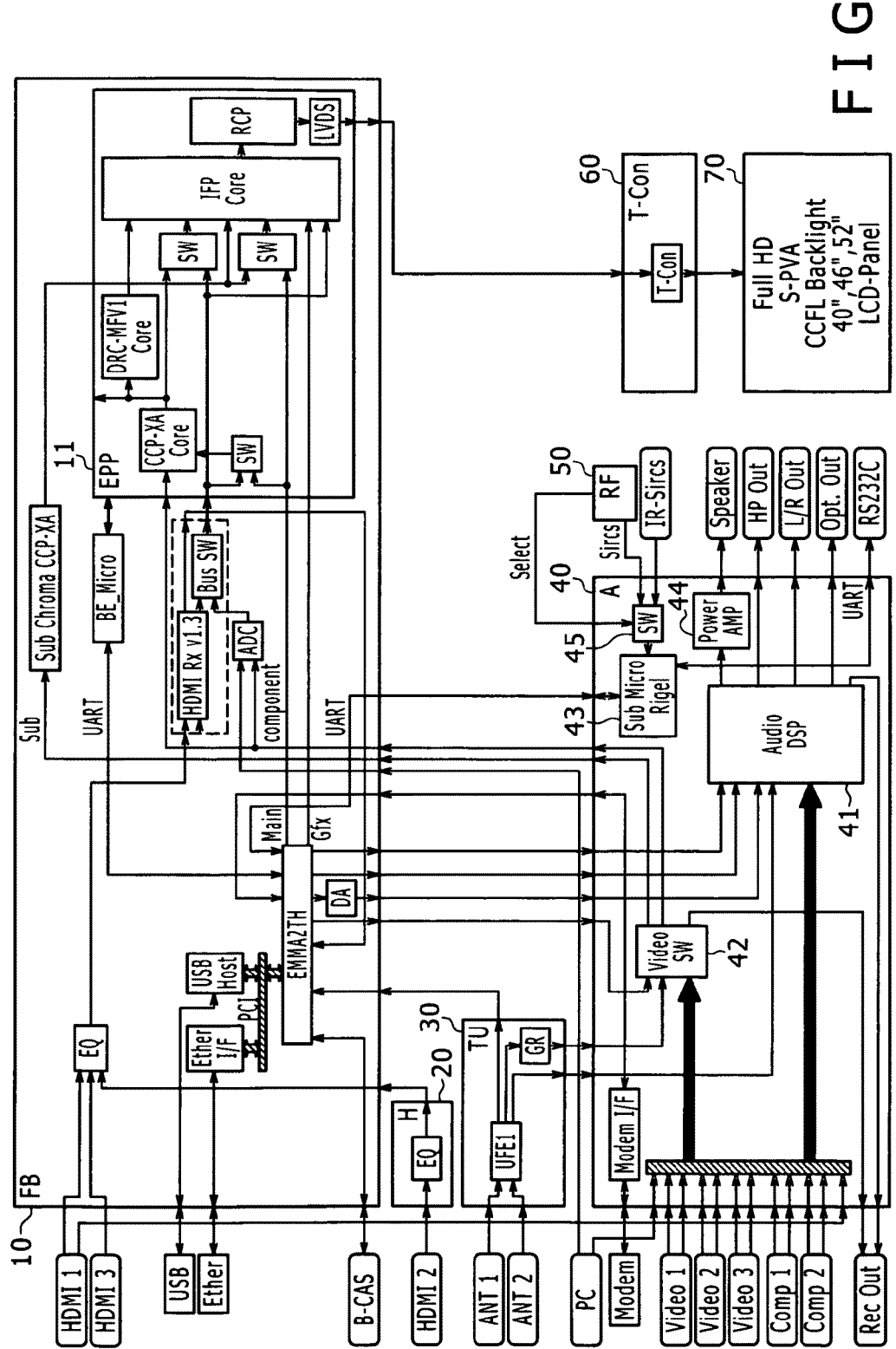
FIG. 1 is a block diagram of a circuit part of a TV receiver according to an embodiment of the present invention.
Figure 2:
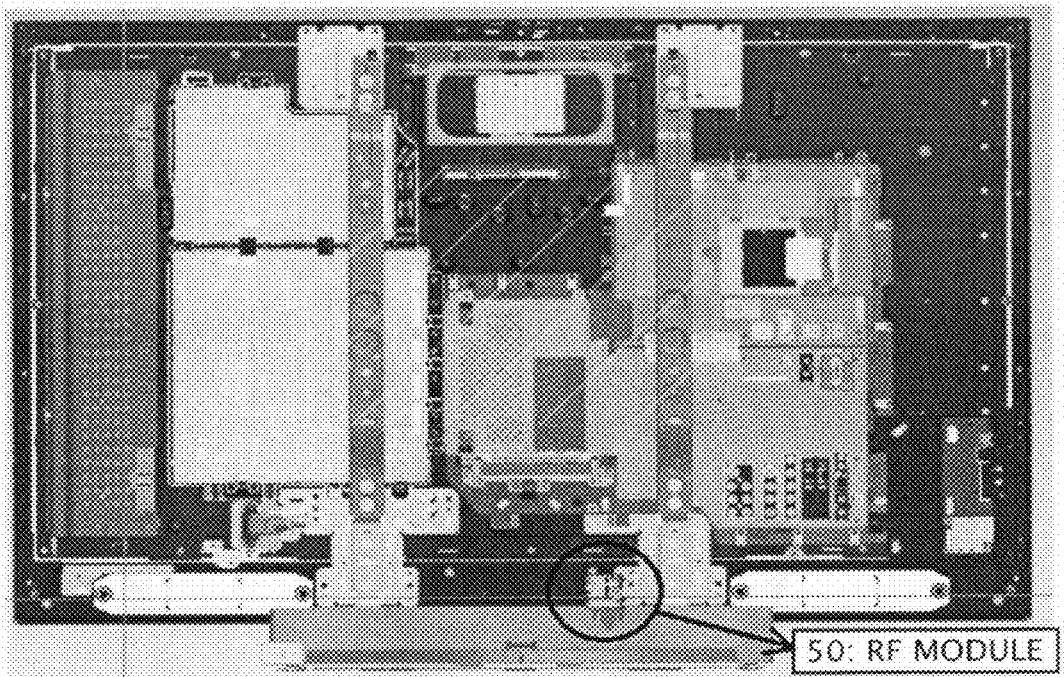
FIG. 2 is a diagram of a mounted arrangement of a circuit of the TV receiver according to the embodiment of the present invention which receiver is illustrated in FIG. 1.
Figure 3:
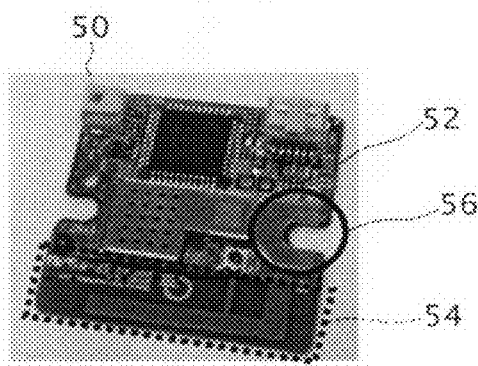
FIG. 3 is a perspective view of an RF board in the mounted circuit arrangement illustrated in FIG. 2.
Figure 4:
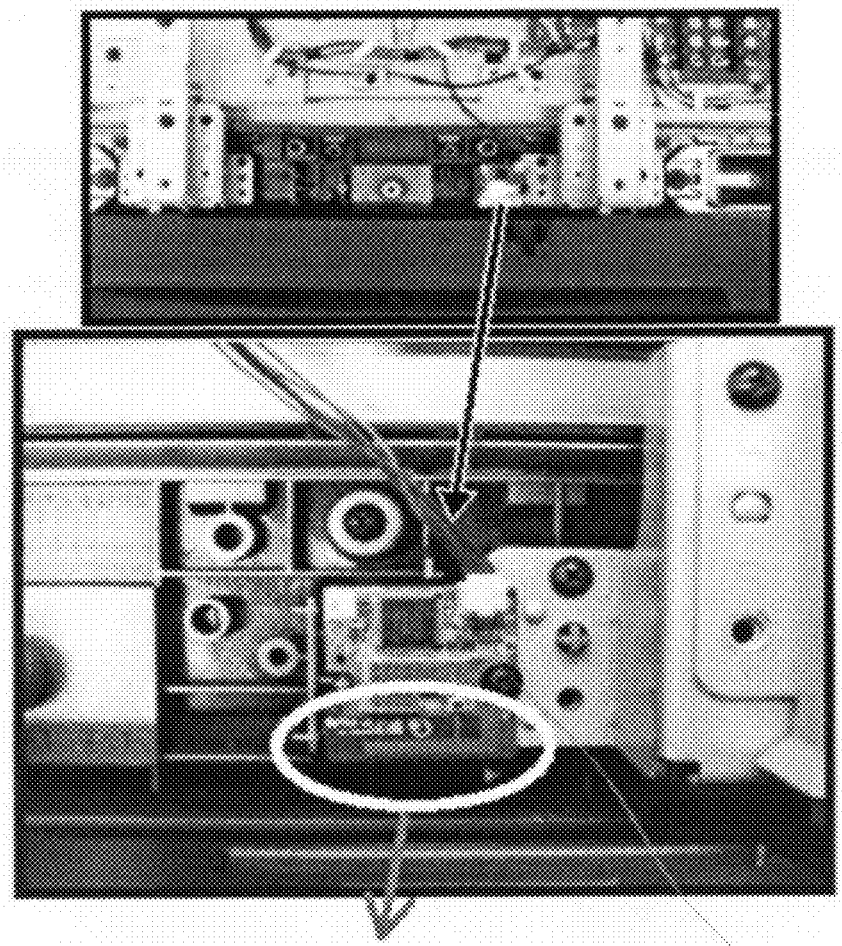
FIG. 4 is a diagram showing an example of mounting the RF board illustrated in FIG. 3.
Figures 6A, 6B, 6C, 6D:
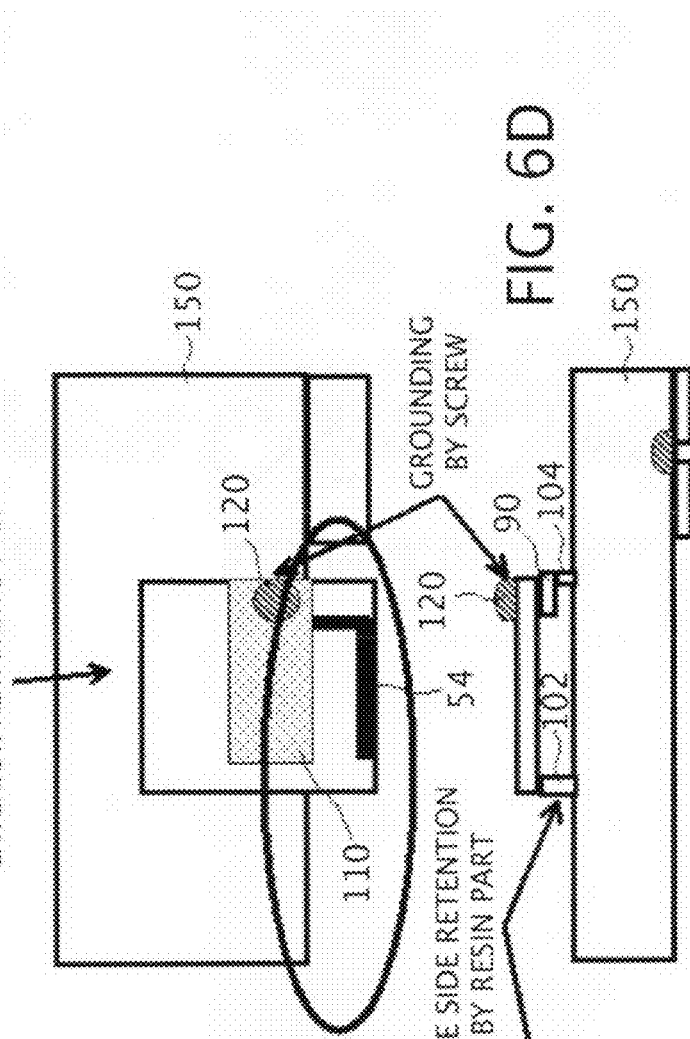
FIGS. 6A, 6B, 6C, and 6D are diagrams of another example of mounting the RF board illustrated in FIG. 3.

FIG. 1 is a block diagram of a circuit part of an embodiment of a TV receiver according to the present invention. FIG. 2 is a diagram of a mounted arrangement of a circuit of the TV receiver according to the embodiment of the present invention which receiver is illustrated in FIG. 1. FIG. 3 is a perspective view of an RF board in the mounted circuit arrangement illustrated in FIG. 2. FIG. 4 is a diagram showing an example of mounting the RF board illustrated in FIG. 3. FIGS. 5A and 5B are diagrams of assistance in explaining an example of mounting the RF board illustrated in FIG. 3 and illustrated in FIG. 4.

In FIG. 1, the TV receiver 1 includes a control signal processing unit 10 for performing video processing and signal processing, an equalizer unit 20, a tuner processing unit 30 for performing input processing on a tuner signal from an antenna, a video and audio signal processing unit 40, an RF unit 50 for an electromagnetic wave type remote control, a controller 60, and a liquid crystal display unit 70.

FIG. 2 is a plan view in which the above-described circuit of the TV receiver 1 excluding the liquid crystal display unit 70 is arranged as a board. The RF unit 50 for the electromagnetic wave type remote control is disposed in a lower part of FIG. 2.

Description in the following will be made centering on parts related to the RF unit 50 for the electromagnetic wave type remote control.

FIG. 3 is a perspective view of the RF unit 50 for the electromagnetic wave type remote control.

The RF unit 50 for the electromagnetic wave type remote control includes: an RF circuit board section 52 having an RF signal processing circuit mounted on the board; an antenna part 54 for transmitting and receiving electromagnetic waves; and a ground connecting section 56.

The RF circuit board section 52 and the antenna part 54 are arranged so as to be opposed to each other with the ground connecting section 56 interposed between the RF circuit board section 52 and the antenna part 54.

The ground connecting section 56 is manufactured from a conductive member, such for example as copper or aluminum. The ground connecting section 56 is formed so as to ground an electronic circuit within the RF circuit board section 52. Specifically, as will be described later, the ground of the electronic circuit within the RF circuit board section 52 reaches a bezel (exterior part) 100 via the ground connecting section 56 and a conductive sheet metal 90, whereby a grounding circuit is established.

On the other hand, when the antenna part 54 is retained by a retaining section (a column support 102, for example, is a part of the retaining section), the antenna part 54 is disposed at a position remote from the conductive sheet metal 90 to which the ground connecting section 56 is fixed.

As shown in FIG. 4 and FIGS. 5A and 5B, the retaining section for retaining the RF unit 50 for the electromagnetic wave type remote control includes the bezel (exterior part) 100, a column support 102 and a conductive column support 104 standing from the bezel (exterior part) 100, and the conductive sheet metal 90 fixed to the conductive column support 104 in parallel with the bezel (exterior part) 100.

As illustrated in FIG. 3, FIG. 4, and FIGS. 5A and 5B, the RF unit 50 for the electromagnetic wave type remote control is fixed on the conductive column support 104 and the column support 102.

The RF unit 50 for the electromagnetic wave type remote control is fixed to the column support 102 in a state of being retained on one side using a resin part, for example.

While the column support 102 may be manufactured from a conductive member or a nonconductive member, because the antenna part 54 is situated in the vicinity of a part where the column support 102 is retained, it is desirable that the column support 102 be manufactured of a nonconductive member. A reason therefor will be described later.

The antenna part 54 needs to be disposed so as not to overlap the conductive sheet metal 90 which functions as a ground fixing sheet metal and is also an exterior retaining part. A reason therefor is that when a conductive member is present within a magnetic field caused by the antenna part 54, the magnetic field is distorted, and the electromagnetic wave is disturbed.

On the other hand, the ground connecting section 56 needs to be connected to the conductive sheet metal 90 via an electromagnetic shield 110 using a screw 120 so that a grounding circuit is established via the conductive sheet metal 90, the conductive column support 104, and the bezel (exterior part) 100.

When the RF unit 50 for the electromagnetic wave type remote control is disposed such that the antenna part 54 and the conductive sheet metal 90 are separated from each other so as not to interfere with each other, and when the RF unit 50 for the electromagnetic wave type remote control is to be grounded (when the grounding circuit is to be established), an additional part is needed. However, the need for the additional part is eliminated by forming the RF unit 50 for the electromagnetic wave type remote control such that the RF unit 50 for the electromagnetic wave type remote control is fixed to the conductive sheet metal 90 using the screw 120, and forming the conductive sheet metal 90 in a shape as shown in the figures and disposing the conductive sheet metal 90 in the manner illustrated above.

It is thereby possible to reduce cost, and reduce mounting within the TV receiver 1.

In addition, a need for an additional part is eliminated by using the conductive sheet metal 90 for grounding the antenna part 54 via the conductive sheet metal 90 also as a sheet metal for fixing the bezel 100. Thus, as in the above, it is possible to reduce cost, and reduce mounting within the TV receiver 1.

Second Embodiment

A TV receiver according to a second embodiment of the present invention will be described with reference to FIGS. 1 to 3 and FIGS. 6A to 6D.

In the second embodiment, parts illustrated in FIGS. 1 to 3 are similar to those of the first embodiment. Hence, the circuit configuration of the TV receiver 1 is similar to that of the first embodiment.

In addition, the configuration and arrangement of an RF unit 50 for an electromagnetic wave type remote control in the second embodiment are similar to the configuration and arrangement of the RF unit 50 for the electromagnetic wave type remote control in the first embodiment as described with reference to FIG. 3. Specifically, the RF unit 50 for the electromagnetic wave type remote control includes: an RF circuit board section 52 having an RF signal processing circuit mounted on a board; an antenna part 54 for transmitting and receiving electromagnetic waves; and a ground connecting section 56. The RF circuit board section 52 and the antenna part 54 are arranged so as to be opposed to each other with the ground connecting section 56 interposed between the RF circuit board section 52 and the antenna part 54.

The ground connecting section 56 is manufactured from a conductive member, such for example as copper or aluminum. The ground connecting section 56 is formed so as to ground an electronic circuit within the RF circuit board section 52 (establish a grounding circuit). Specifically, as will be described later, the ground of the electronic circuit within the RF circuit board section 52 reaches a bezel (exterior part) 100 via the ground connecting section 56 and a conductive sheet metal 90, whereby a grounding circuit is established.

On the other hand, when the antenna part 54 is retained by a retaining section (a column support 102, for example, is a part of the retaining section), the antenna part 54 is disposed at a position remote from the conductive sheet metal 90 to which the ground connecting section 56 is fixed.

The second embodiment is different from the first embodiment in terms of contents illustrated in FIGS. 6A to 6D. Description in the following will be made centering on items different from the first embodiment.

As illustrated in FIGS. 6A to 6D, in the second embodiment, a column support 102 and a conductive column support 104 stand on one side of a fixing section 150, and a conductive sheet metal 90 is fixed to the conductive column support 104.

A bezel (exterior part) 100 for retaining an exterior part is fixed to another side of the fixing section 150 by a screw 130.

A method of fixing the ground connecting section 56 of the RF unit 50 for the electromagnetic wave type remote control to the conductive sheet metal 90 fixed to the conductive column support 104 through the intervention of an electromagnetic shield 110 and a method of retaining one side of the antenna part 54 on the column support 102 using a resin part, for example, are similar to those of the first embodiment.

Thus, also in the second embodiment, as in the first embodiment, the antenna part 54 is disposed so as not to overlap the conductive sheet metal 90 which functions as a ground fixing sheet metal and is also an exterior retaining part.

On the other hand, the ground connecting section 56 is connected to the conductive sheet metal 90 via the electromagnetic shield 110 using a screw 120, and thus connected to the conductive sheet metal 90, the conductive column support 104, and the fixing section 150, whereby a grounding circuit is established.

As in the first embodiment, when the RF unit 50 for the electromagnetic wave type remote control is disposed such that the antenna part 54 and the conductive sheet metal 90 are separated from each other so as not to interfere with each other, and when the RF unit 50 for the electromagnetic wave type remote control is to be grounded (when the grounding circuit is to be established), an additional part is needed. However, the need for the additional part is eliminated by forming the RF unit 50 for the electromagnetic wave type remote control such that the RF unit 50 for the electromagnetic wave type remote control is fixed to the conductive sheet metal 90 using the screw 120, and forming the conductive sheet metal 90 in a shape as shown in the figures and disposing the conductive sheet metal 90 in the manner illustrated above.

It is thereby possible to reduce cost, and reduce mounting within the TV receiver 1.

In addition, as described in the first embodiment, a need for an additional part is eliminated by using the conductive sheet metal 90 for grounding the antenna part 54 via the conductive sheet metal 90 also as a sheet metal fixed to the fixing section 150 via the conductive column support 104. Thus, as in the above, it is possible to reduce cost, and reduce mounting within the TV receiver 1.

In addition, the same as described in the first embodiment is applied to the second embodiment.

In embodying the present invention, the present invention is not limited to the exemplifications described above, and various modified modes can be taken.

For example, while a TV receiver has been described as an embodiment of the present invention, contents relating to the present invention described above are applicable to various electronic devices such as air conditioners that use an electromagnetic wave type remote control in place of an infrared type remote control or that are likely to use an electromagnetic wave type remote control in the future.

As described above, according to the embodiments of the present invention, it is possible to establish a grounding circuit for an electronic circuit effectively and isolate an antenna part from a conductive member even when using an electromagnetic wave type remote control.

It should be understood by those skilled in the art that various modifications, combinations, sub-combinations and alterations may occur depending on design requirements and other factors insofar as they are within the scope of the appended claims or the equivalents thereof.

What is claimed is:

1. A television receiver comprising:
   a radio frequency section for an electromagnetic wave type remote control, said radio frequency section being configured to transmit and receive an electromagnetic wave to and from the electromagnetic wave type remote control; and
   a retaining section configured to retain said radio frequency section for the electromagnetic wave type remote control;
   wherein said radio frequency section for the electromagnetic wave type remote control includes
   a radio frequency circuit board section,
   an antenna part disposed so as to be separated from said radio frequency circuit board section, and a ground connecting section disposed between said radio frequency circuit board section and said antenna part and connected to a grounding system within said radio frequency circuit board section,
said retaining section includes
a conductive column support standing on a bezel,
a column support standing on said bezel, and
a conductive sheet metal parallel with said bezel and fixed to said conductive column support,
said ground connecting section of said radio frequency section for the electromagnetic wave type remote control is fixed to said conductive sheet metal using a conductive fixture, and a grounding circuit of said radio frequency circuit board section is established via said bezel, and
the antenna part of said radio frequency section for the electromagnetic wave type remote control is retained on one side by said column support at a position separated from said conductive sheet metal.

2. The television receiver according to claim 1, wherein when said ground connecting section is fixed via a screw, an electromagnetic shield is inserted between said antenna part and said screw.

3. The television receiver according to claim 1, wherein when said antenna part of said radio frequency section for the electromagnetic wave type remote control is retained on one side by said column support at a position separated from said conductive sheet metal, said antenna part of said radio frequency section for the electromagnetic wave type remote control is retained by a resin part.

4. The television receiver according to claim 1, wherein said retaining section and said radio frequency section for the electromagnetic wave type remote control are disposed at a position separated from a signal processing circuit within the television receiver.

5. An electronic device comprising:
a radio frequency section for an electromagnetic wave type remote control, said radio frequency section being configured to transmit and receive an electromagnetic wave to and from the electromagnetic wave type remote control; and
a retaining section configured to retain said radio frequency section for the electromagnetic wave type remote control;
wherein said radio frequency section for the electromagnetic wave type remote control includes
a radio frequency circuit board section,
an antenna part disposed so as to be separated from said radio frequency circuit board section, and
a ground connecting section disposed between said radio frequency circuit board section and said antenna part and connected to a grounding system within said radio frequency circuit board section,
said retaining section includes
a conductive column support standing on a bezel,
a column support standing on said bezel, and
a conductive sheet metal parallel with said bezel and fixed to said conductive column support,
said ground connecting section of said radio frequency section for the electromagnetic wave type remote control is fixed to said conductive sheet metal using a conductive fixture, and a grounding circuit of said radio frequency circuit board section is established via said bezel, and
said antenna part of said radio frequency section for the electromagnetic wave type remote control is retained on one side by said column support at a position separated from said conductive sheet metal.

6. A television receiver comprising:
radio frequency means for an electromagnetic wave type remote control, for transmitting and receiving an electromagnetic wave to and from the electromagnetic wave type remote control; and
retaining means for retaining said radio frequency means for the electromagnetic wave type remote control;
wherein said radio frequency means for the electromagnetic wave type remote control includes
radio frequency circuit board means,
an antenna part disposed so as to be separated from said radio frequency circuit board means, and
ground connecting means disposed between said radio frequency circuit board means and said antenna part and connected to a grounding system within said radio frequency circuit board means,
said retaining means includes
a conductive column support standing on a bezel,
a column support standing on said bezel, and
a conductive sheet metal parallel with said bezel and fixed to said conductive column support,
said ground connecting means of said radio frequency means for the electromagnetic wave type remote control is fixed to said conductive sheet metal using a conductive fixture, and a grounding circuit of said radio frequency circuit board means is established via said bezel, and
the antenna part of said radio frequency means for the electromagnetic wave type remote control is retained on one side by said column support at a position separated from said conductive sheet metal.

7. An electronic device comprising:
radio frequency means for an electromagnetic wave type remote control, for transmitting and receiving an electromagnetic wave to and from the electromagnetic wave type remote control; and
retaining means for retaining said radio frequency means for the electromagnetic wave type remote control;
wherein said radio frequency means for the electromagnetic wave type remote control includes
radio frequency circuit board means,
an antenna part disposed so as to be separated from said radio frequency circuit board means, and
ground connecting means disposed between said radio frequency circuit board means and said antenna part and connected to a grounding system within said radio frequency circuit board means,
said retaining means includes
a conductive column support standing on a bezel,
a column support standing on said bezel, and
a conductive sheet metal parallel with said bezel and fixed to said conductive column support,
said ground connecting means of said radio frequency means for the electromagnetic wave type remote control is fixed to said conductive sheet metal using a conductive fixture, and a grounding circuit of said radio frequency circuit board means is established via said bezel, and
said antenna part of said radio frequency means for the electromagnetic wave type remote control is retained on one side by said column support at a position separated from said conductive sheet metal.

\* \* \* \* \*